United States Patent [19]

Pickles et al.

[11] Patent Number: 5,085,692
[45] Date of Patent: Feb. 4, 1992

[54] RECOVERY OF SILVER VALUES FROM CHLORIDES INCLUDING SILVER CHLORIDE

[75] Inventors: Christopher A. Pickles, Newburgh; James M. Toguri, Mississauga; Hieu Truong, Orleans; Janet G. Clark, Ottawa, all of Canada

[73] Assignee: Royal Canadian Mint, Ottawa, Canada

[21] Appl. No.: 572,565

[22] Filed: Aug. 27, 1990

[30] Foreign Application Priority Data

Sep. 28, 1989 [CA] Canada ................................. 614229

[51] Int. Cl.⁵ ............................................ C22B 11/00
[52] U.S. Cl. ...................................................... 75/634
[58] Field of Search ............................................. 75/634

[56] References Cited

U.S. PATENT DOCUMENTS

| | | |
|---|---|---|
| 1,454,351 | 5/1923 | Thomas . |
| 2,218,250 | 10/1940 | Reid ........................ 75/83 |
| 2,535,536 | 12/1950 | Hagmaier ................. 75/93 |
| 3,902,890 | 9/1975 | Sanmiya .................... 75/24 |
| 3,929,466 | 12/1975 | Moynahan et al. ....... 75/83 |
| 4,053,305 | 10/1977 | Smyres ..................... 75/104 |
| 4,124,379 | 11/1978 | Peters ....................... 75/118 |
| 4,388,109 | 6/1983 | Kunda ..................... 75/0.5 B |
| 4,448,604 | 5/1984 | Day ........................... 75/63 |
| 4,528,166 | 7/1985 | McDougall ............... 423/23 |
| 4,613,365 | 9/1986 | Berg ........................... 75/83 |
| 4,640,710 | 2/1987 | Beutier ...................... 75/108 |

FOREIGN PATENT DOCUMENTS

| | | | |
|---|---|---|---|
| 63113 | 5/1898 | Canada . | |
| 1064708 | 10/1979 | Canada | 53/220 |
| 1096178 | 2/1981 | Canada | 53/232 |
| 1190047 | 7/1985 | Canada | 53/220 |

OTHER PUBLICATIONS

Entwistle "Refining $2,000,000 of Gold per Week", Jan. 1938.
Coyle—"Some Thermodynamics and Kinetic Aspects of the Refining of Gold", Feb. 1966.
International Precious Metals Institute, Symposium on Recovery, Reclamation and Refining of Precious Metals, Mar. 10, 1981, p. 8.
Sanmiya—"Oxygen Refining of Smelted Silver Residues", Jun. 1980.

*Primary Examiner*—Peter D. Rosenberg
*Attorney, Agent, or Firm*—Cushman, Darby & Cushman

[57] ABSTRACT

This invention relates to the recovery of silver values from silver chloride or mixed chlorides including silver chloride. A pyrometallurgical process is provided in which chloride residues are smelted with an agent such as sodium silicate that provides alkali metal oxide without generating gases, such as carbon dioxide, that would result in foaming during smelting to a material extent.

15 Claims, No Drawings

RECOVERY OF SILVER VALUES FROM CHLORIDES INCLUDING SILVER CHLORIDE

This invention relates to the recovery of silver values from silver chloride or mixed chlorides including silver chloride.

The process of this invention is for example, applicable to the mixed chlorides produced when chlorine is bubbled through impure gold in accordance with what is known as the Miller process. The Miller process is further described in "Some Thermodynamics and Kinetic Aspects of the Refining of Gold" by T. J. Coyle et al, February 1966, Journal of the South African Institute of Mining and Metallurgy, page 297. Silver chlorides are also generated in silver electrolysis. It also is found as a waste product of the photographic and other industries.

In the past, the silver and copper had been recovered from the mixed chlorides by a hydrometallurgical operation. The hydrometallurgical process involved a large number of steps and had some associated environmental problems.

A pyrometallurgical process has also been used for the recovery of silver values from residues containing silver chloride. This involved smelting with sodium carbonate as described in a paper entitled "Silver Chloride" by Dave Schnelles presented at a Symposium on Recovery, Reclamation and Refining of Precious Metals, March 10-13, 1981, Sheraton Harbor Island, San Diego, Calif. In experimental work at the Royal Canadian Mint, the mixed chloride residues of the Miller process have been smelted with sodium carbonate together with carbon. Although good recoveries are obtainable on a laboratory scale, however, on a large pilot plant scale, it was found that the carbon dioxide and oxygen which were evolved created a large amount of foaming which restricted the smelting rate and thus the material throughput rate. Scale-up of the results to the full-scale operation indicated that the production rates would not be satisfactory.

An object of this invention is to provide a pyrometallurgical process for the recovery of silver values without significant foaming.

This object is achieved by providing a process for the recovery of silver values from residues including silver chloride, comprising the steps of smelting the chloride residue with an agent that provides alkali metal oxide without generating gases, such as carbon dioxide that would result in material foaming during smelting, in the presence of a flux to provide metallic silver values above which there is a slag, and separating the silver values from the slag.

In accordance with a further aspect of this invention, the agent that provides alkali metal oxide is an alkali metal silicate and preferably sodium silicate. Sodium peroxide will also produce sodium oxide without generating carbon dioxide.

It has been found that, particularly when using sodium silicate, the reaction is far less violent than when sodium carbonate is employed. The operation is more readily controllable. Sodium silicate can be used as an agent to give high recoveries. A flux such as borax minimizes the loss of silver to the slag phase largely by reducing its viscosity. Also a small percentage of carbon is desirable to enhance the reducing condition of the reaction environment and results in a higher percentage recovery of silver in the metallic phase.

The mixed chloride feed compositions resulting from the Miller process of purifying gold comprise 30 to 60% silver as AgCl and 3 to 25% copper in the form of CuCl. There may also be impurities including NaCl, $FeCl_3$, $FeCl_2$, $PbCl_2$ and $ZnCl_2$. These impurities may comprise up to 25% of the mixed chlorides. Although the foregoing indicates the range of feed compositions encountered during normal practice, the process of this invention would be applicable to an even wider range of chloride feed grades from 1% to 99% AgCl.

A suitable flux such as borax is used to reduce the silica slag phase viscosity, to reduce the metallic silver entrainment and to allow for more efficient thermal mixing, thus allowing the chemicals to react thoroughly. This results in a high metal content recovery. It also facilitates the pouring and final separation of the materials at the end of the process. Other suitable fluxes could be used such as boric oxide that generates oxide or potassium oxide.

The agent that generates sodium oxide or potassium oxide is selected to avoid material foaming during smelting. It is, as has been previously indicated, preferably sodium or potassium silicate. This agent should be used in an excess of the stoichiometric requirement and preferably in an amount that will provide for a 10% to 20% theoretical reagent excess.

It is desirable to add charcoal or some other source of carbon unless a decision is made to leave the copper in the slag phase, and to accept also some loss of silver. The amount of carbon can vary over a wide range dependent on the desired recovery of copper. Typical is 0 to 4% by weight based on the weight of mixed chlorides. Preferably 2 to 4% by weight is used.

The process is based on the reactions as described by the following equations:

$$2AgCl + Na_2SiO_3 \rightarrow 2NaCl + 2Ag + SiO_2 + \tfrac{1}{2}O_2$$

$$2CuCl + C + Na_2SiO_3 \rightarrow 2NaCl + 2Cu + SiO_2 + CO$$

The process can be conducted with or without carbon. If carbon is added, the copper oxide which forms when reacting with the $Na_2SiO_3$ is reduced to Cu and combines with the reduced Ag. If the process is conducted without carbon, most of the copper will remain in the slag phases. The main benefit of adding the carbon is to enhance the Ag recovery. Optimization tests have found that the silver recovery can be increased to 98% or more when carbon is used compared to only 78% without carbon. It is felt that silver recovery may be enhanced by the presence of copper. Copper will exchange with the unreacted AgCl as follows:

$$Cu + AgCl \rightleftharpoons Ag + CuCl$$

The exchange reaction involving silver is as follows:

$$2AgCl + Na_2O\,SiO_2 \rightarrow Ag_2O + 2NaCl + SiO2$$

The silver oxide is then reduced according to the following equation:

$$Ag_2O \rightarrow 2Ag + \tfrac{1}{2}O_2$$

The exchange reaction involving copper is as follows:

$$2CuCl + Na_2O\,SiO_2 \rightarrow Cu_2O + SiO_2 + 2NaCl$$

The copper oxide is then reduced according to the following equation:

$$Cu_2O + C \rightarrow 2Cu + CO$$

Slag grades will vary depending upon the reaction conditions. However, the following data is typical. The salt slag may contain up to 1.6% Ag and 8% Cu. The silica borax slag may contain 1.6% Ag and 4% Cu.

Copper recovery is of secondary importance as it is of little economic value compared with silver. The extent of recovery will vary according to the amount of sodium silicate and carbon and will range between about 10% and 90%.

It is preferred that the smelting reaction be carried out at a temperature in the range 1200° C.–1400° C., and preferably 1300° C. to 1400° C., which produces a smooth and rapid reaction requiring minimal mixing. Slightly lower temperatures can be used but would require additional reaction time and mixing. Too high a temperature could result in excessive volatilization losses. A typical time is 30 minutes melting time, followed by an additional 10 minutes allowed to ensure that the reaction is complete and good fluidity (i.e. lower viscosity) to afford good phase separation.

Equipment requirements will vary depending on the various application parameters. The process is not specific to being only successfully conducted in one type of furnace. Both radiant and inductive heat sources have proved to provide successful reaction environment.

A 125 Kw. 3000 Hz tilting type induction furnace has successfully been used in developing the data provided herein. A clay graphite crucible was employed, coated with alumina to extend its life. Graphite and steel molds were used for the various reaction products.

Numerous schemes can be used to separate the slag and metallic phases. These procedures will vary depending upon the various production requirements for each specific application.

One factor which must be common in all systems in order to facilitate good separation is that the three phases must be molten and be allowed to settle together at high temperature (i.e. 1200° C.–1400° C.) with only minimal turbulence, before being separated. This is required to allow the phases to separate out due to their relative insolubility in each other and their different densities. Separation is into three phases. The silver alloy will settle to the bottom. The layer on top will be the combined borax and silica slag followed by the salt slag.

Separation is achieved by discharging the reaction products from the furnace into a cooling and slag reception crucible. Cooling is by natural convection. The products are allowed to settle for approximately two minutes at which time the slags are removed. The silver alloy button will generally have frozen by then.

The fluid slag is then poured off, following which the borax slag is poured out leaving the metallic silver alloy button at the bottom.

This invention will be further illustrated by the following examples:

EXAMPLE 1

The following reagent charge is selected to provide good recoveries for a range of incoming feeds without requiring a previous analysis of the chlorides to determine the theoretical requirements.

For example: Use -
15 kg chlorides (AgCl/Cu$_2$Cl$_2$ + other)
6.75 kg sodium silica
1.5 kg borax (anhydrous)
0.6 kg of carbon Recovery calculations n a pilot plant test run were as follows (recoveries were calculated on the basis of the reaction products)

| | |
|---|---|
| Feed chloride grade | 60.87% silver |
| | 3.43% copper |
| Theoretical Na$_2$SiO$_2$ required | 5.70345 kg |
| % excess Na$_2$SiO$_2$ | 18.35% |
| Recovery of silver metal | 98.39% |
| Recovery of copper | 48.57% |
| Weight of salt slag | 4.0648 kg |
| Assay of salt slag | 1.24% silver |
| | 4.05% copper |
| Weight of silica slag | 6.3678 kg |
| Assay of silica slag | 1.57% silver |
| | 1.11% copper |

EXAMPLE 2

The reagent charge was the same as in Example 1 except that no carbon was included. The results were:

| | |
|---|---|
| Feed chloride grade | 55.95% silver |
| | 6.85% copper |
| Theoretical Na$_2$SiO$_2$ required | 5.7804 Kg |
| % excess Na$_2$SiO$_2$ | 16.77% |
| Recovery of silver metal | 82.36% |
| Recovery of copper | 11.40% |
| Weight of salt slag | 7.7309 Kg |
| Assay of salt slag | 15.91% silver |
| | 7.14% copper |
| Weight of silica slag | 7.4531 Kg |
| Assay of silica slag | 3.01 silver |
| | 5.07 copper |

What is claimed is:

1. A process for the recovery of silver values from residues including silver chloride, comprising the steps of smelting the chloride residue with an alkali metal silicate, in the presence of a flux, to form an alkali metal oxide without generating gases that would result in foaming during smelting to a material extent, reacting the alkali metal oxide with silver chloride to provide metallic silver values above which there is a slag, and separating said silver values from the slag.

2. A process as in claim 1 in which the alkali metal silicate is sodium silicate.

3. A process as in claim 1, in which the residue is mixed chlorides comprising AgCl and CuCl produced when chlorine is bubbled through molten gold, and in which the silver values are separated and recovered as a silver-copper alloy.

4. A process as in claim 1, in which the flux is borax.

5. A process as in claim 3, in which the mixed chloride feed comprises 0–25% of impurities.

6. A process as in claim 1, in which following smelting the resulting melt is poured into a cooling mold and settled at a temperature of 1200° C. to 1400° C.

7. A process as in claim 1, in which the gas that would result in foaming is carbon dioxide 8. A process as in claim 1, in which carbon is present during the smelting step in an amount up to about 4% by weight relative to the feed 9. A process as in claim 1, in which carbon is present in the smelting step in an amount in the range 2% to 4%.

10. A process as in claim 1, in which said slag has an upper and lower layer, the upper layer comprising a salt slag and the lower layer comprising the flux and silica.

11. A process as in claim 1 or 2, in which the alkali metal silicate is present in an amount that is in excess of the stoichiometric requirement.

12. A process of claim 1, in which the alkali metal silicate is present in an amount 10% to 20% greater than the stoichiometric requirement.

13. A process as in claim 1, in which said slag has an upper and lower layer, the upper layer comprising a salt slag and the lower layer comprising the flux and silica and in which the silver-copper alloy is separated from the slag by first allowing the silver-copper alloy to freeze, then pouring off the fluid salt slag while still molten and at a time when the lower slag layer of flux and silica is viscous and finally pouring off said lower slag layer to leave the silver-copper alloy 14. A process as in claim 13, in which carbon is present during smelting in an amount within the range 2% to 4% by weight relative to the feed.

15. A process for the recovery of silver from mixed chlorides produced as a residue when chlorine is bubbled through molten gold, said mixed chlorides comprising AgCl and CuCl, comprising smelting at a temperature of about 1200° C. to 1400° C., the mixed chloride residue with sodium silicate in an amount about 10 to 20% theoretical reagent excess, a borax flux and carbon, pouring the melt into a cooling mold and allowing the melt to settle at a temperature in the range of about 1200° C. to 1400° C. to provide a silver-copper alloy above which is a lower slag layer of borax and silica and then an upper slag layer of salt and then separating the silver-copper alloy by first allowing the silver-copper alloy to freeze, then pouring off the fluid salt slag layer while still molten and at a time when the lower slag layer of flux and silica is viscous and finally pouring off said lower slag layer to leave the silver-copper alloy.

* * * * *